Patented Jan. 14, 1936

2,028,068

UNITED STATES PATENT OFFICE 2,028,068

PROCESS FOR DISSOLVING RUBBER FOR THE MANUFACTURE OF PAINTS, VARNISHES, AND LIKE PRODUCTS, AND FOR INSULATING PURPOSES

John Patrick Henharen, Durban, Union of South Africa

No Drawing. Application December 5, 1934, Serial No. 756,180. In Union of South Africa May 19, 1934

7 Claims. (Cl. 134—17)

In the manufacture of paints, varnishes and like products, no satisfactory process has yet been proposed for bringing rubber into solution in the finished product. There are several known solvents for rubber but none of them can be employed with advantage in the manufacture of paint and like products.

The object of this invention is to provide a process for dissolving rubber (which term is intended to include kindred bodies such as gutta percha) to produce a product suitable for use in the manufacture of paints, varnishes and like products and for insulating purposes.

According to this invention the rubber is dissolved for the purposes set forth by heating to about 300° Fahrenheit a mixture of crude wood oil, rosin and boiled linseed oil, adding a drier and further heating to between 300° and 540° Fahrenheit and then adding rubber and further heating until the rubber is dissolved. The heating after the addition of the rubber is preferably effected at from 600° to 650° Fahrenheit.

By heating the mixture of crude wood oil, rosin and boiled linseed oil to a suitable temperature, as for example 300° Fahrenheit, pyroligneous acid is produced. A suitable drier, as for example cobalt linoleate, or other suitable linoleate or resinate, is then added and the mixture heated to about 540° Fahrenheit. When the rubber is added and heating continued the rubber is found readily to dissolve. The resulting product may be worked up in the usual manner into paints, varnishes, enamels or like products, or may be used for insulating purposes; the finished products are durable and weatherproof.

The relative proportions of the ingredients depend on the strength desired in the resulting product. For example for heavy paints the relative proportion of rubber to the other ingredients is greater than for light paints.

The crude wood oil and/or boiled linseed oil in the said mixture may be replaced by any neutral oil.

The relative proportions of rosin, crude wood oil and boiled linseed oil may be varied but it is usually preferred to use the said ingredients in about equal proportions. The amount of rubber added may be, for example, between about 10 and 20 per cent of the weight of the total.

The amount of drier added depends on the drier used, on the reaction conditions and on the desired product and may be, for example, from 0.1 to 3 per cent of the mixture before the rubber is added.

The following example will further illustrate how the said invention may be carried out in practice, but the invention is not restricted to this example. The parts are by weight.

Example

From 25 to 30 parts of rosin, from 25 to 30 parts of crude wood oil and from 25 to 30 parts of boiled linseed oil are heated together in a suitable vessel to a temperature of about 300° Fahrenheit. There is then added from 0.1 to 3 per cent of an active drier, such as cobalt linoleate, depending on the strength desired, and the heating is continued until the mixture reaches a temperature of 540° Fahrenheit, whereby catalytic action takes place. From 7 to 22 parts of rubber are added, the temperature thus being reduced. Heating is continued until the temperature of the combined substances reaches from 600° to 650° Fahrenheit whereupon external heating is discontinued and the mixture stirred until the rubber passes into solution. The resulting product forms a suitable medium for use in the manufacture of paint, varnish, enamel or like products, and of insulating compositions, and has the effect of rendering the finished article more durable and weather-proof.

What I claim is:—

1. A process for dissolving rubber to produce a product suitable for use in the manufacture of paints, varnishes and like products and for insulating purposes which comprises heating a mixture of crude wood oil, rosin and boiled linseed oil at about 300° F., adding a drier and further heating to about 540° F., adding rubber and further heating until the rubber has dissolved.

2. A process for dissolving rubber to produce a product suitable for use in the manufacture of paints, varnishes and the like products and for insulating purposes which comprises heating a mixture of a neutral vegetable oil and rosin at about 300° F., adding a drier and further heating to about 540° F., adding rubber and further heating until the rubber has dissolved.

3. A process for dissolving rubber to produce a product suitable for use in the manufacture of paints, varnishes and like products and for insulating purposes which comprises heating a mixture or crude wood oil, rosin and boiled linseed oil at about 300° F., adding a linoleate and further heating to about 540° F., adding rubber and further heating until the rubber has dissolved.

4. A process for dissolving rubber to produce a product suitable for use in the manufacture of paints, varnishes and like products and for insulating purposes which comprises heating a mixture of crude wood oil, rosin and boiled linseed oil to about 300° F., adding a resinate and further heating to about 540° F., adding rubber and further heating until the rubber has dissolved.

5. A process for dissolving rubber to produce a product suitable for use in the manufacture of paints, varnishes and like products and for insulating purposes which comprises heating a mixture of neutral vegetable oil and rosin to about 300° F., adding a linoleate and further heating to about 540° F., adding rubber and further heating until the rubber has dissolved.

6. A process for dissolving rubber to produce a product suitable for use in the manufacture of paints, varnishes and like products and for insulating purposes which comprises heating a mixture of a neutral vegetable oil and rosin to about 300° F., adding a resinate and further heating to about 540° F., adding rubber and further heating until the rubber has dissolved.

7. A process for dissolving rubber to produce a product suitable for use in the manufacture of paints, varnishes and like products and for insulating purposes which comprises heating a mixture of 25 to 30 parts of rosin, 25 to 30 parts of crude woot oil and 25 to 30 parts of boiled linseed oil to 300° F., adding 0.1 to 3% of cobalt linoleate, further heating to a temperature of 540° F., adding 7 to 22 parts of rubber and further heating to 600° to 650° F. until the rubber has dissolved.

JOHN PATRICK HENHAREN.